US012615197B2

(12) United States Patent
Teramoto et al.

(10) Patent No.: US 12,615,197 B2
(45) Date of Patent: Apr. 28, 2026

(54) ANALYSIS DEVICE, ANALYSIS METHOD, AND ANALYSIS PROGRAM

(71) Applicant: NTT, Inc., Tokyo (JP)

(72) Inventors: Yasuhiro Teramoto, Tokyo (JP); Masanori Yamada, Tokyo (JP); Yukio Nagafuchi, Tokyo (JP); Masanori Shinohara, Tokyo (JP); Takaaki Koyama, Tokyo (JP); Yoshiaki Nakajima, Tokyo (JP)

(73) Assignee: NTT, Inc., Tokyo (JP)

( * ) Notice: Subject to any disclaimer, the term of this patent is extended or adjusted under 35 U.S.C. 154(b) by 87 days.

(21) Appl. No.: 18/565,143

(22) PCT Filed: Jun. 7, 2021

(86) PCT No.: PCT/JP2021/021635
§ 371 (c)(1),
(2) Date: Nov. 29, 2023

(87) PCT Pub. No.: WO2022/259335
PCT Pub. Date: Dec. 15, 2022

(65) Prior Publication Data
US 2024/0205117 A1     Jun. 20, 2024

(51) Int. Cl.
*H04L 41/12*     (2022.01)
*H04L 43/026*     (2022.01)

(52) U.S. Cl.
CPC ............ *H04L 43/026* (2013.01); *H04L 41/12* (2013.01)

(58) Field of Classification Search
CPC ..... H04L 43/026; H04L 41/12; H04L 43/028; H04L 43/12; H04L 43/26
See application file for complete search history.

(56) References Cited

U.S. PATENT DOCUMENTS

2007/0014233 A1 * 1/2007 Oguro ................. H04L 41/0677
                                                           370/216
2010/0315975 A1 * 12/2010 Arkin .................... H04L 12/413
                                                           370/254

(Continued)

FOREIGN PATENT DOCUMENTS

CN          106201827 B     11/2018
CN          110474816 B     7/2020
JP          4809880 B2     11/2011

*Primary Examiner* — Chris Parry

(57)                ABSTRACT
An analysis server acquires observation information including a transmission source IP address, a transmission source MAC address, a transmission destination IP address, and a transmission destination MAC address in communication from each of sensing devices. The analysis server estimates a topology of a network on the basis of the acquired observation information. On the basis of the estimated topology, an analysis server creates a monitoring list indicating communication that is a target for transmission of the observation information for each sensing device such that any one sensing device on a path of the communication transmits the observation information of the communication for each piece of communication in the network, and transmits the monitoring list to the sensing device. Thereafter, each sensing device transmits the observation information of the communication to the analysis server on the basis of the monitoring list.

8 Claims, 12 Drawing Sheets

(56)          References Cited

U.S. PATENT DOCUMENTS

| | | | |
|---|---|---|---|
| 2011/0170402 A1* | 7/2011 | Kikuchi | H04L 43/0829 |
| | | | 370/242 |
| 2013/0148547 A1* | 6/2013 | Page | H04L 41/12 |
| | | | 370/255 |
| 2014/0064056 A1* | 3/2014 | Sakata | H04L 41/00 |
| | | | 370/216 |
| 2022/0345373 A1* | 10/2022 | Barnes | H04L 43/10 |
| 2024/0015084 A1* | 1/2024 | Gupta | G06F 16/174 |

* cited by examiner

| ID | Src IP | Src MAC | Dst IP | Dst MAC |
|---|---|---|---|---|
| SW1 | PC1 | PC1 | PC2 | PC2 |
| SW1 | PC1 | PC1 | PC3 | (R1) |
| SW2 | PC1 | (R2) | PC3 | PC3 |
| SW1 | PC1 | PC1 | PC4 | (R1) |
| SW2 | PC1 | (R2) | PC4 | PC4 |
| SW1 | PC2 | PC2 | PC3 | (R1) |
| SW2 | PC2 | (R2) | PC3 | PC3 |
| SW1 | PC1 | PC1 | PC5 | (R1) |
| SW3 | PC1 | (R3) | PC5 | PC5 |
| SW1 | PC1 | PC1 | (W1) | (R1) |
| SW1 | PC1 | PC1 | (W2) | (R1) |

601

◯ ··· MAC ADDRESS OF ROUTER
◌ ··· IP ADDRESS OF EXTERNAL TERMINAL

602

603

| IP | COLLEC-TION |
|---|---|
| PC1 | ◯ |
| PC2 | ◯ |
| PC3 | × |
| PC4 | × |
| PC5 | × |
| * | ◯ |

604

| IP | COLLEC-TION |
|---|---|
| PC1 | × |
| PC2 | × |
| PC3 | ◯ |
| PC4 | ◯ |
| PC5 | × |
| * | ◯ |

605

| IP | COLLEC-TION |
|---|---|
| PC1 | × |
| PC2 | × |
| PC3 | × |
| PC4 | × |
| PC5 | ◯ |
| * | ◯ |

ANALYSIS DEVICE, ANALYSIS METHOD, AND ANALYSIS PROGRAM

CROSS-REFERENCE TO RELATED APPLICATIONS

This application is a U.S. 371 Application of International Patent Application No. PCT/JP2021/021635, filed on 7 Jun. 2021, the disclosure of which is hereby incorporated herein by reference in its entirety.

TECHNICAL FIELD

The present invention relates to an analysis apparatus, an analysis method, and an analysis program for analyzing communication in a network.

BACKGROUND ART

Conventionally, there is a technology in which, in order to monitor communication in a network without omission, communication in the network is observed by a plurality of sensing devices and observation information is acquired. The observation information is information indicating an observation result of communication, and includes IP addresses of a transmission source and a transmission destination, MAC addresses of the transmission source and the transmission destination, and the like of the communication.

CITATION LIST

Patent Literature

Patent Literature 1: Japanese Patent No. 4809880

SUMMARY OF INVENTION

Technical Problem

However, when communication in a network is observed by a plurality of sensing devices, the same communication may be observed by the plurality of sensing devices. In such a case, an analysis server redundantly receives observation information of the same communication from a plurality of sensing devices, and thus reception efficiency of the observation information is not good.

In a case where a plurality of sensing devices observe communication across a plurality of Layer 3 networks (L3 NWs), different MAC addresses are set for an interface of a router installed at a boundary between the networks. Therefore, the analysis server may receive observation information with different MAC addresses associated with IP addresses from a plurality of sensing devices.

In such a case, the analysis server cannot determine whether the MAC addresses associated with the IP addresses are different due to routing or impersonation of a terminal. Thus, when the analysis server performs detection of an impersonated terminal or the like by using a pair of an IP address and a MAC address indicated in observation information of communication, there is a possibility of erroneous detection.

Therefore, an object of the present invention is to solve the above problem and appropriately monitor communication in a network.

Solution to Problem

In order to solve the above problems, the present invention provides an analysis apparatus including: an acquisition unit that acquires observation information of communication including a transmission source IP address, a transmission source MAC address, a transmission destination IP address, and a transmission destination MAC address in the communication from each communication observation device that observes the communication in a network; an estimation unit that estimates a topology of the network on the basis of the acquired observation information; an allocation unit that allocates the communication observation devices such that any one communication observation device on a path of the communication transmits the observation information of the communication for each piece of communication flowing through the network on the basis of the estimated topology, an installation position of the communication observation device, and the observation information of the communication acquired from the communication observation device; a list creation unit that creates a monitoring list indicating communication that is a target for transmission of the observation information from the communication observation device for each communication observation device on the basis of a result of the allocation, and a list transmission unit that transmits the created monitoring list for each of the communication observation devices to each of the communication observation devices.

Advantageous Effects of Invention

According to the present invention, it is possible to appropriately monitor communication in a network.

DESCRIPTION OF EMBODIMENTS

Figure 1:
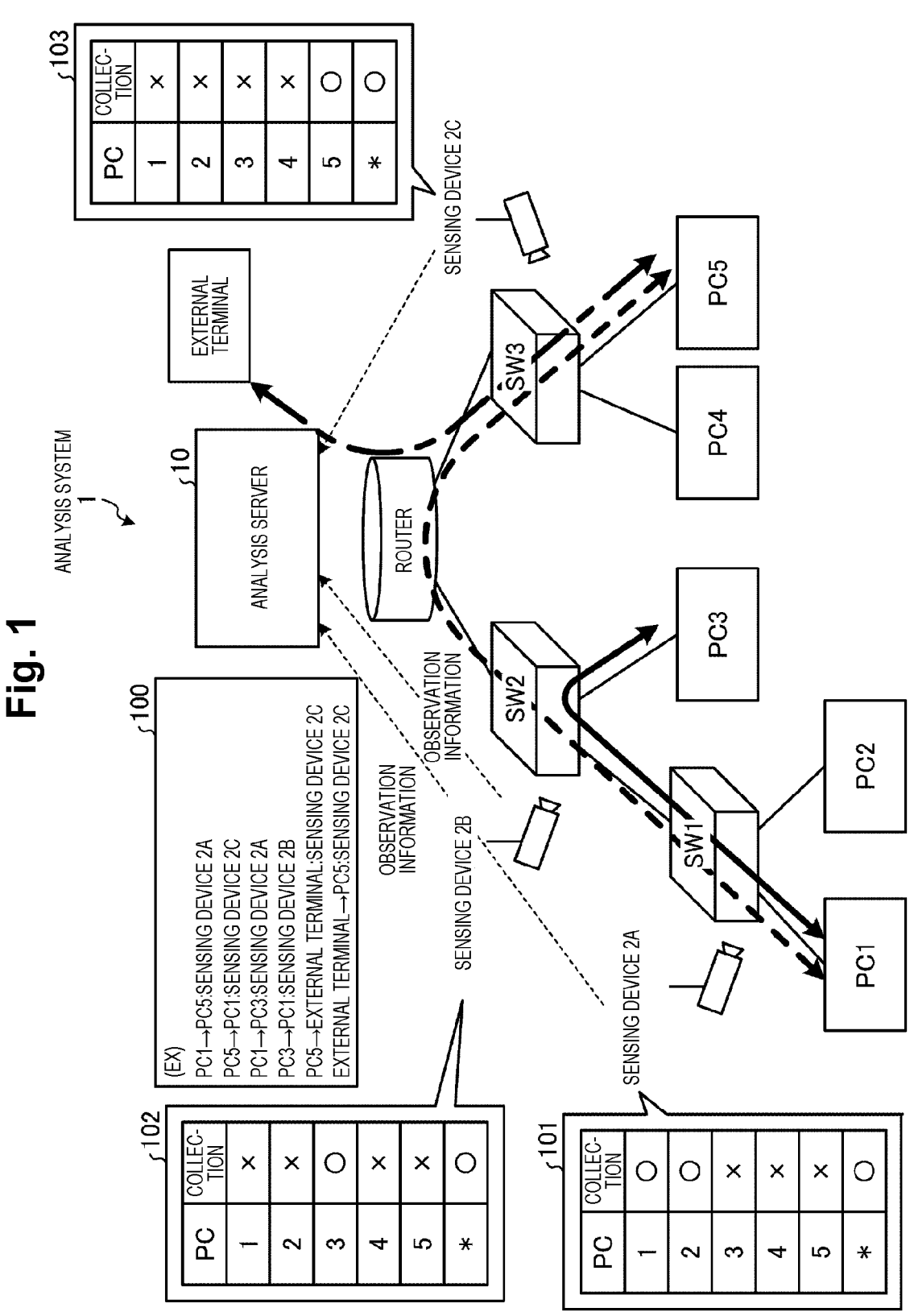
FIG. 1 is a diagram for describing an outline of an analysis system.

Hereinafter, modes for carrying out the present invention (embodiments) will be described with reference to the drawings. The present invention is not limited to the embodiments described below.

3

[Outline]

First, an outline of an operation of an analysis system 1 including an analysis apparatus (analysis server) 10 will be described with reference to FIG. 1. The analysis system 1 includes sensing devices 2 (for example, sensing devices 2A, 2B, and 2C) and an analysis server 10. Switching hubs (SWs; for example, SW1, SW2, and SW3) are installed in a network.

Each sensing device (communication observation device) 2 observes communication in the network that is a monitoring target. For example, each sensing device 2 observes communication between PCs (terminals) via the SW in the network that is a monitoring target by using a port mirror or the like, and creates observation information. Each sensing device 2 transmits the created observation information to the analysis server 10. The observation information includes, for example, a transmission source IP address, a transmission source MAC address, a transmission destination IP address, and a transmission destination MAC address of communication in an observation target.

The analysis server 10 estimates a topology (refer to FIG. 1) of the network that is a monitoring target on the basis of the observation information received from each sensing device 2. The analysis server 10 creates, for each sensing device 2, a monitoring list indicating communication that is a target for transmission (collection target) of the observation information from the sensing device 2, on the basis of the estimated topology.

For example, on the basis of the estimated topology, the analysis server 10 allocates the sensing devices 2A, 2B, and 2C such that any one of the sensing devices 2 on a path of communication transmits observation information of the communication for each piece of communication flowing in the network (refer to the reference numeral 100).

The analysis server 10 creates, for each sensing device 2, for example, a monitoring list (for example, monitoring lists 101, 102, and 103) indicating communication that is a target for transmission of the observation information from the sensing device 2 on the basis of an allocation result denoted by the reference numeral 100. The analysis server 10 transmits the created monitoring lists to the sensing devices 2A, 2B, and 2C.

For example, the analysis server 10 transmits the monitoring list 101 to the sensing device 2A, transmits the monitoring list 102 to the sensing device 2B, and transmits the monitoring list 103 to the sensing device 2C. Each of the sensing devices 2A, 2B, and 2C transmits observation information of communication to the analysis server 10 on the basis of the monitoring list transmitted from the analysis server 10.

For example, in the communication illustrated in FIG. 1, the sensing device 2A transmits observation information of communication from PC1 to PC5 and communication from PC1 to PC3 to the analysis server 10 on the basis of the monitoring list 101. The sensing device 2B transmits observation information of communication from PC3 to PC1 to the analysis server 10 on the basis of the monitoring list 102. The sensing device 2C transmits observation information of communication from PC5 to an external terminal and from the external terminal to PC5 to the analysis server 10 on the basis of the monitoring list 103.

As described above, the analysis server 10 can prevent observation information of the same communication from being redundantly received from each sensing device 2 as far as possible.

The analysis server 10 can estimate an IP address and a MAC address of a router in a network and an IP address of a terminal (external terminal) installed outside the network (that is, the outside of the network divided by the router) on the basis of the observation information received from each of the sensing devices 2. As a result, the analysis server 10 can reduce erroneous detection in detection of an impersonated terminal by using the IP address and MAC address indicated in the observation information from each sensing device 2.

The analysis server 10 transmits, for each sensing device 2, a monitoring list indicating communication that is to be a target for transmission of observation information from the sensing device 2 to the sensing device 2. Consequently, each sensing device 2 can determine which observation information is to be transmitted without making an inquiry to another device.

Configuration Example

Next, a configuration example of the analysis system 1 will be described with reference to FIG. 2. The analysis system 1 includes the plurality of sensing devices 2 and the analysis server 10.

The sensing device 2 transmits, to the analysis server 10, observation information of communication indicated in the monitoring list (refer to the monitoring lists 101 to 103 in FIG. 1) transmitted from the analysis server 10.

The analysis server 10 includes a communication unit 11, a storage unit 12, and a control unit 13. The communication unit 11 is a communication interface with an external device. The communication unit 11 receives observation information from the sensing device 2 or transmits a monitoring list to the sensing device 2 via a network such as the Internet.

The storage unit 12 stores data to be referred to when the control unit 13 executes various processes and data created by the control unit 13 executing various processes. For example, the storage unit 12 stores observation information acquired from each of the sensing devices 2 or information (topology information) indicating a topology of a network created by the control unit 13.

The control unit 13 controls the entire analysis server 10. The control unit 13 includes an acquisition unit 130, an estimation unit 131, an allocation unit 132, a list creation unit 133, a list transmission unit 134, an analysis unit 135, and a control processing unit 136.

The acquisition unit 130 acquires observation information of communication from each sensing device 2. The acquisition unit 130 stores the acquired observation information in the storage unit 12.

The estimation unit 131 estimates a topology of the network on the basis of the observation information acquired from each sensing device 2. That is, the estimation unit 131 estimates a disposition and connection of a router, an apparatus (for example, a SW), and a terminal (for example, a PC) of the network that is a monitoring target, and an IP address and a MAC address allocated to each device. The estimation unit 131 estimates a router via which an external terminal of the network that is a monitoring target is connected and an IP address allocated to the external terminal.

For example, the estimation unit 131 estimates an IP address and a MAC address of the terminal, an IP address and a MAC address of the router, and an IP address of the external terminal of the network that is a monitoring target, on the basis of a difference between pieces of observation information acquired from the respective sensing devices 2. The estimation unit 131 estimates a topology (for example, the topology illustrated in FIG. 1) of an L2 network in a subnet by using the estimation result. Details of estimation of a topology by the estimation unit 131 will be described later with reference to the drawings.

The allocation unit 132 allocates communication that is a target for transmission of observation information from each sensing device 2 on the basis of the topology estimated by the estimation unit 131, the installation position of each sensing device 2, and the observation information of communication from each sensing device 2.

For example, the allocation unit 132 allocates each sensing device 2 for each piece of communication flowing through the network such that any one of the sensing devices 2 of SWs on a path of the communication transmits the observation information of the communication on the basis of the topology estimated by the estimation unit 131, the installation position of each sensing device 2, and the observation information of the communication from each sensing device 2.

For example, the allocation unit 132 allocates the sensing device 2A as the sensing device 2 that transmits observation information of communication from PC1 to PC5 among the sensing devices 2 (2A, 2B, and 2C) of SW1, SW2, and SW3 on the path from PC1 to PC5 illustrated in FIG. 1. The allocation unit 132 allocates the sensing device 2C as the sensing device 2 that transmits observation information of communication from PC5 to PC1 among the sensing devices 2 (2A, 2B, and 2C) of SW1, SW2, and SW3 on the path from PC5 to PC1.

The allocation unit 132 performs the above allocation process on the sensing device 2 for each piece of communication flowing through the network. Consequently, communication that is to be a target for transmission of observation information is allocated to each sensing device 2.

The list creation unit 133 creates a monitoring list indicating communication that is a target for transmission of observation information for each sensing device 2 on the basis of the allocation result from the allocation unit 132. For example, as illustrated in the monitoring lists 101 to 103 in FIG. 1, this monitoring list is information indicating a transmission source IP address related to communication that is a target for transmission of the observation information from the sensing device 2 and a transmission source IP address related to communication that is not a target for transmission.

The monitoring list will be described in detail with reference to FIG. 3. Here, a case is considered in which the list creation unit 133 creates a monitoring list 301 for the sensing device 2A and a monitoring list 302 for the sensing device 2B illustrated in FIG. 3, and creates a monitoring list 303 for the sensing device 2C.

For example, the monitoring list 301 indicates that communication in which transmission sources are PC1 and PC2 is a target for transmission of observation information, but communication in which transmission sources are PC3, PC4, and PC5 is not a target for transmission of observation information. It is indicated that all pieces of communication in which transmission sources are not PC3, PC4, and PC5 are targets for transmission of observation information.

The monitoring list 302 indicates that communication in which transmission sources are PC3 and PC4 is a target for transmission of observation information, but communication in which transmission sources are PC1, PC2, and PC5 is not a target for transmission of observation information. It is indicated that all pieces of communication in which transmission sources are not PC1, PC2, and PC5 are targets for transmission of observation information.

The monitoring list 303 indicates that communication in which a transmission source is PC5 is a target for transmission of observation information, but communication in which transmission sources are PC1, PC2, PC3, and PC4 is not a target for transmission of observation information. It is indicated that all pieces of communication in which transmission sources are not PC1, PC2, PC3, and PC4 are targets for transmission of observation information.

For example, the sensing device 2A transmits observation information of communication from PC1 to PC3 to the analysis server 10 but does not transmit observation information of communication from PC3 to PC1 to the analysis server 10 on the basis of the monitoring list 301.

The sensing device 2B transmits observation information of communication from PC3 to PC1 to the analysis server 10 but does not transmit observation information of communication from PC1 to PC3 to the analysis server 10 on the basis of the monitoring list 302.

The sensing device 2C transmits observation information of communication from W2 (external terminal) to PC5 and observation information of communication from PC5 to W2 to the analysis server 10 on the basis of the monitoring list 303.

Consequently, the analysis server 10 can reduce a possibility of redundantly receiving observation information of the same communication from each sensing device 2. For example, in a case where there is only one sensing device 2 on the communication path as in the communication between W2 and PC5 illustrated in FIG. 3, the analysis server 10 creates the monitoring list 303 in which the sensing device 2 (that is, the sensing device 2C) transmits observation information of the communication from W2 to PC5 and the communication from PC5 to W2, and transmits the monitoring list to the sensing device 2C. Consequently, the analysis server 10 can receive observation information of communication in the network that is a monitoring target without omission.

Figure 2:
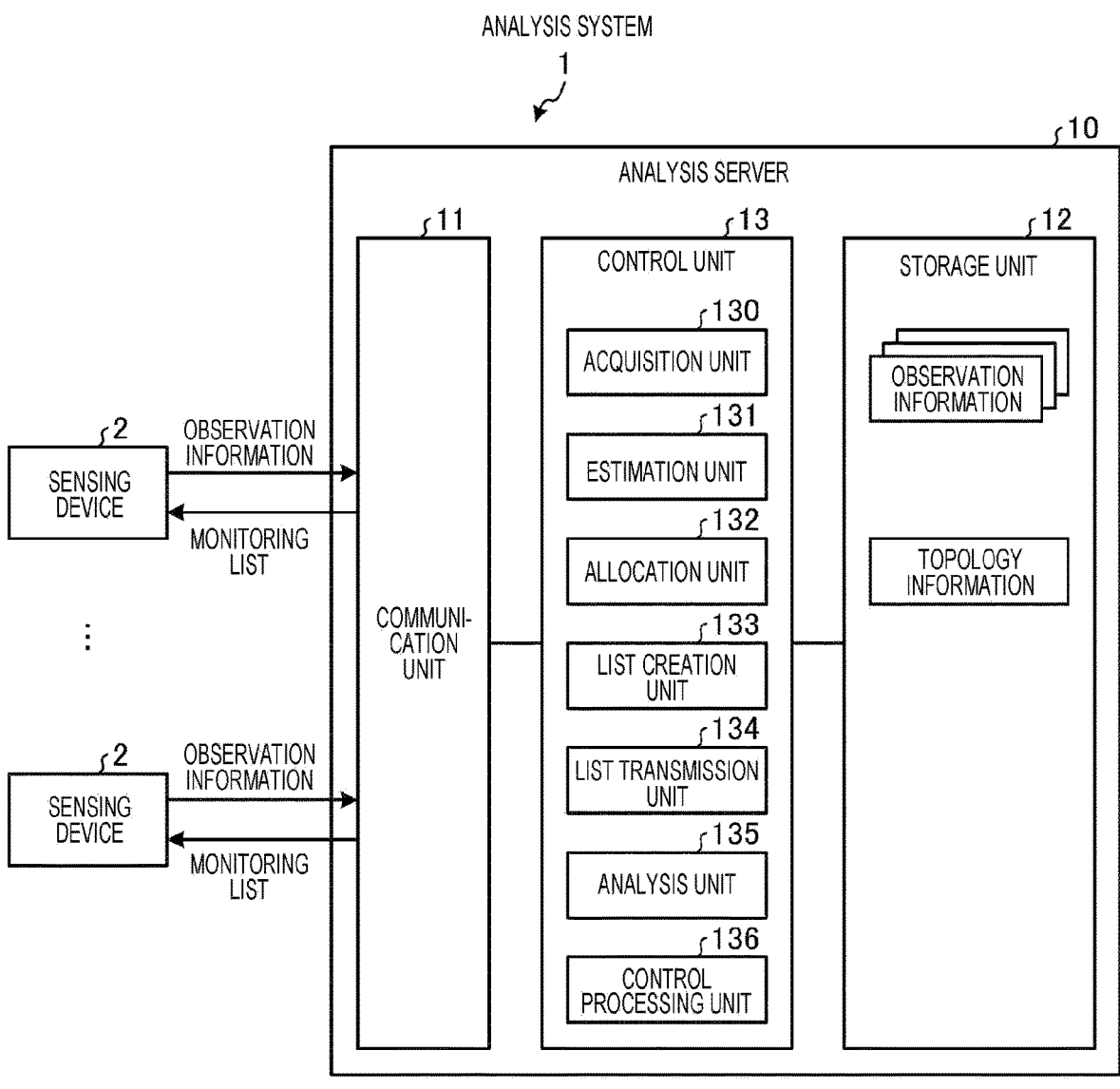
FIG. 2 is a diagram illustrating a configuration example of the analysis system.

The description returns to FIG. 2. The list transmission unit 134 transmits the monitoring list created by the list creation unit 133 to each sensing device 2. For example, the list transmission unit 134 transmits the monitoring list 301 illustrated in FIG. 3 to the sensing device 2A, transmits the monitoring list 302 to the sensing device 2B, and transmits the monitoring list 303 to the sensing device 2C.

The description returns to FIG. 2. The analysis unit 135 analyzes communication in the network on the basis of the observation information of each piece of communication in the network acquired by the acquisition unit 130.

For example, when the observation information is acquired via the acquisition unit 130, the analysis unit 135 detects communication performed by an impersonated terminal by comparing a pair of the transmission source IP address and the transmission source MAC address in the observation information with a pair of an IP address and a MAC address of each terminal, router, or the like indicated in the topology information stored in the storage unit 12.

For example, the analysis unit 135 detects a change in the topology on the basis of the observation information of the communication acquired by the acquisition unit 130. For example, the analysis unit 135 detects the presence or absence of a change in the topology by comparing an estimated new topology with the topology stored in the storage unit 12 on the basis of the observation information acquired by the acquisition unit 130. When it is detected that there is a change in the topology, the analysis unit 135 outputs a detection result (for example, which terminal in the network has been added and which terminal has been moved).

Consequently, a user of the analysis server 10 can ascertain that there is a possibility that an unauthorized terminal has been connected to the network and that there has been a change in the network configuration due to movement of a terminal or an apparatus.

The control processing unit 136 controls each unit of the control unit 13. For example, in a case where the analysis unit 135 detects that there is a change in the topology of the network, when the user of the analysis server 10 determines that the change in the topology is not illegal, the control processing unit 136 instructs the allocation unit 132 to allocate communication that is a target for transmission of observation information from each sensing device 2 on the basis of the estimated new topology and the observation information.

In response to the instruction, the allocation unit 132 reallocates communication that is a target for transmission of observation information from each sensing device 2 on the basis of the estimated new topology and the observation information. Next, the list creation unit 133 recreates the monitoring list for each of the sensing devices 2 by using the result of the reallocation described above. Thereafter, the list transmission unit 134 transmits the recreated monitoring list to each sensing device 2. Thereafter, each sensing device 2 transmits observation information on the basis of the new monitoring list.

Consequently, the analysis server 10 can appropriately receive observation information from each of the sensing devices 2 even when there is a change in a network configuration.

Processing Example

Next, estimation of a topology of a network by the estimation unit 131 and creation of a monitoring list by the list creation unit 133 will be described with reference to FIGS. 4 to 6.

(Estimation 1 of MAC Address of Router)

First, estimation of an IP address of a router and a MAC address associated with the IP address by the estimation unit 131 will be described with reference to FIG. 4.

Here, a case where the sensing device 2 acquires observation information from SW1, SW2, and SW3 in a network denoted by the reference numeral 401 will be described as an example. An arrow denoted by the reference numeral 401 indicates communication in the network. In the network denoted by the reference numeral 401, W1 and W2 denote external terminals, and RT denotes a router.

The estimation unit 131 creates a list 402 indicating observation information of communication (a transmission source IP address (Src IP), a transmission source MAC address (Src MAC), a transmission destination IP address (Dst IP), and a transmission destination MAC address (Dst MAC) of the communication) via SW1, SW2, and SW3 acquired by the acquisition unit 130. The estimation unit 131 creates, for each MAC address, the list 403 indicating an IP address associated with the MAC address on the basis of the list 402.

Here, the router replaces a MAC address of an IP address of a packet that is a routing target with a MAC address allocated to the router. Therefore, a plurality of IP addresses are associated with the MAC address allocated to the router. Thus, in the list 403, the MAC address of the router is associated with a plurality of IP addresses. Therefore, the estimation unit 131 estimates R1 and R2, which are MAC addresses associated with a plurality of IP addresses in the list 403, as MAC addresses of the router.

(Estimation 2 of MAC Address of Router)

Figure 5:
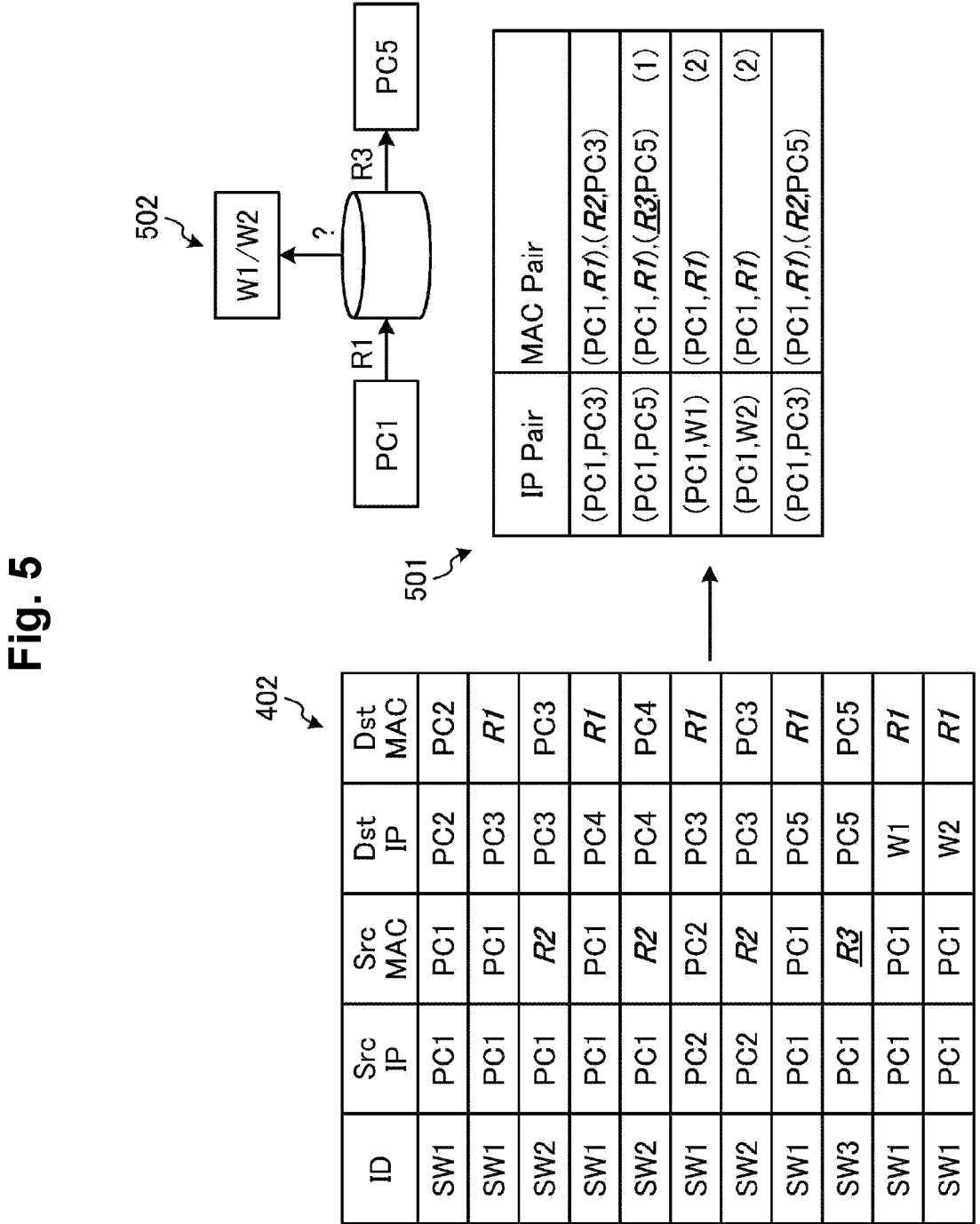
FIG. 5 is a diagram for describing estimation 2 of a MAC address of a router and estimation of an IP address of an external terminal.

FIG. 5 will be described. Next, for each pair of (a transmission source IP address (Src IP) and a transmission destination IP address (Dst IP)) in the list 402, the estimation unit 131 creates a list 501 indicating a pair of (a transmission source MAC address (Src MAC) and a transmission destination MAC address (Dst MAC)) corresponding to the pair.

Figure 4:
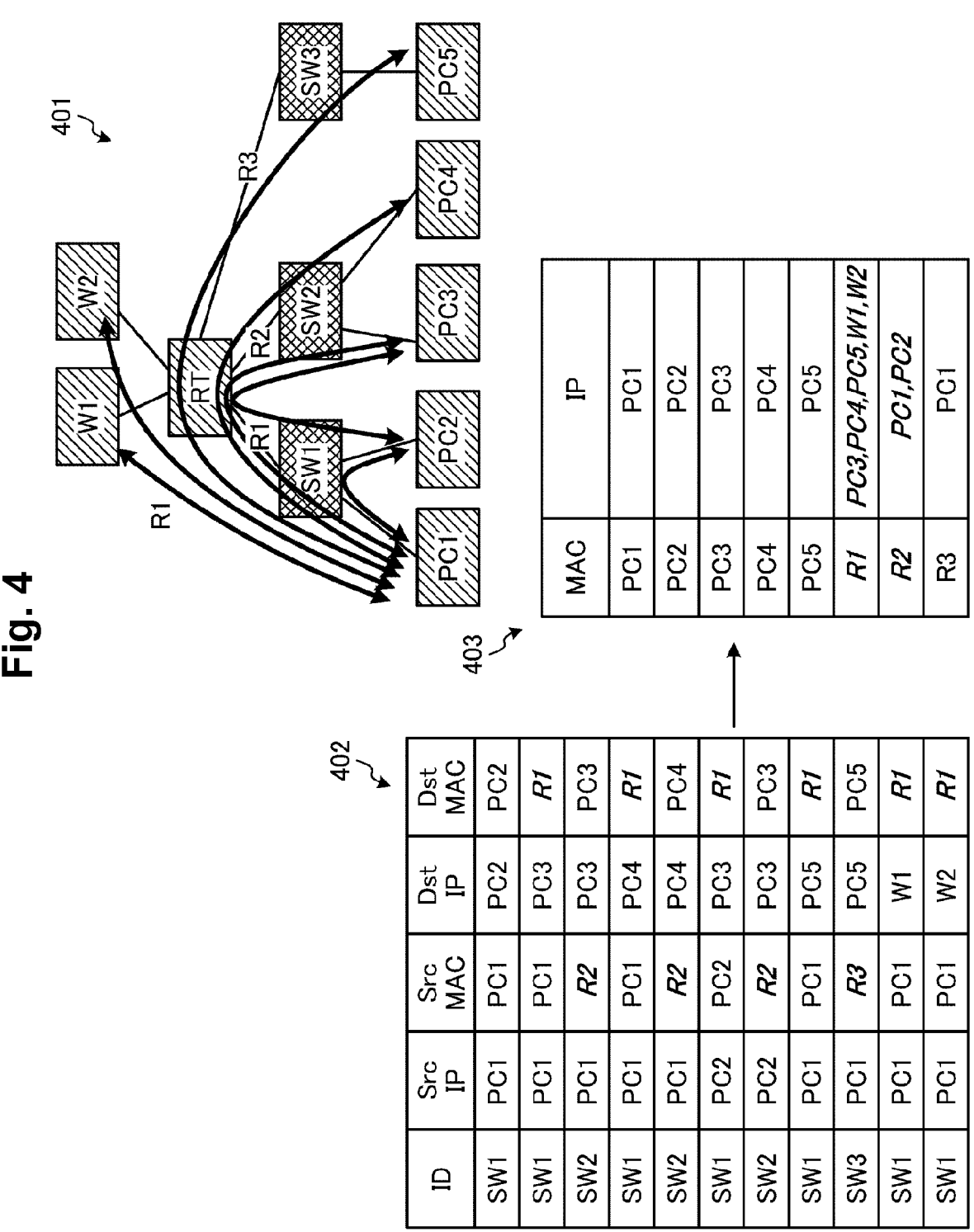
FIG. 4 is a diagram for describing estimation 1 of a MAC address of a router.

Here, in the list 501, when there are a plurality of (a transmission source MAC address, a transmission destination MAC address) pairs for the same (transmission source IP address and transmission destination IP address) and a transmission destination MAC address in one of the pairs is the MAC address of the router estimated in (Estimation 1 of MAC address of router) described in FIG. 4, the transmission source MAC addresses of the other pairs can be considered as a MAC address of an exit IF (interface) of the router (refer to the reference numeral 502).

For example, pairs of (transmission source MAC address, transmission destination MAC address) for (PC1, PC5) in the list 501 are (PC1, R1) and (R3, PC5). Of the pairs, the transmission destination MAC address (R1) in the pair of (PC1, R1) is a MAC address of the router estimated in (Estimation 1 of MAC address of router) described in FIG. 4.

Here, the transmission source MAC address (R3) in another pair (R3, PC5) is not estimated as a MAC address of the router in (Estimation 1 of MAC address of router) described in FIG. 4, but can be considered as a MAC address of the exit IF of the router (refer to the reference numeral 502).

Therefore, the estimation unit 131 estimates R3 in the above pair of (R3, PC5) as the MAC address of the router (refer to (1) in the list 501). By performing the above process, the estimation unit 131 can also estimate the MAC address of the router that cannot be estimated in (Estimation 1 of MAC address of router) described with reference to FIG. 4.

(Estimation of External Terminal)

In the list 501 illustrated in FIG. 5, in a case where there is only one pair of (transmission source MAC address, transmission destination MAC address) with respect to the same (transmission source IP address, transmission destination IP address), and it is ascertained that a transmission destination MAC address in the pair is the MAC address of the router, the pair of (transmission source IP address, transmission destination IP address) can be considered to be a pair with an IP address of the external terminal (refer to the reference numeral 502 and (2) in the list 501).

Therefore, for example, each of the pairs of IP addresses of (PC1, W1) and (PC1, W2) in the list 501 can be considered as a pair indicating communication with the external terminal. Therefore, the estimation unit 131 estimates W1 and W2 as IP addresses of the external terminals.

(Estimation of Topology)

Next, estimation of a topology of a network by the estimation unit 131 will be described with reference to FIG. 6. The estimation unit 131 estimates a topology of the network by using the MAC address of the router and the IP address of the external terminal estimated through the above process.

Figure 6:
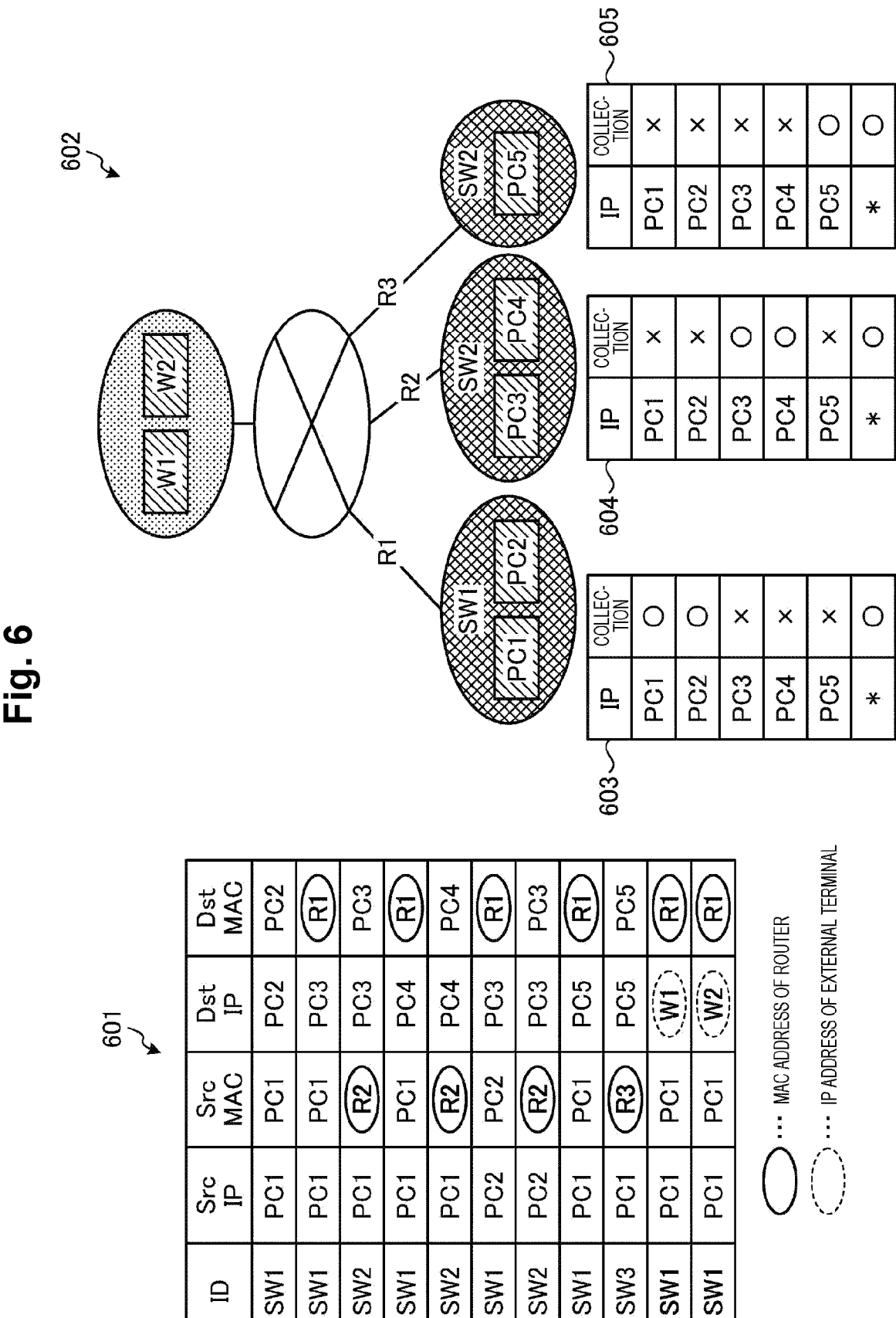
FIG. 6 is a diagram for describing estimation of a topology.

For example, the estimation unit 131 estimates the topology of the network indicated by the reference numeral 602 by using observation information (transmission source IP addresses (Src IP), transmission source MAC addresses (Src MAC), transmission destination IP addresses (Dst IP), and transmission destination MAC addresses (Dst MAC) of communication) of SW1, SW2, and SW3 denoted by the reference numeral 601 in FIG. 6 and the MAC address of the router and the IP address of the external terminal estimated through the above process.

On the basis of the estimated topology, the allocation unit 132 performs allocation for each piece of communication flowing through the network such that any one of the sensing devices 2 capable of transmitting observation information of the communication transmits the observation information of the communication.

For example, in the topology denoted by the reference numeral 602, the allocation unit 132 allocates communication of PC1 and PC2 to the sensing device 2 of SW1, allocates communication of PC3 and PC4 to the sensing device 2 of SW2, and allocates communication of PC5 to the sensing device 2 of SW3.

The list creation unit 133 creates monitoring lists 603 to 605 on the basis of the allocation results. That is, the list creation unit 133 creates the monitoring list 603 for the sensing devices 2 of SW1, creates the monitoring list 604 for the sensing devices 2 of SW2, and creates the monitoring list 605 for the sensing devices 2 of SW3. Thereafter, the list transmission unit 134 transmits the monitoring lists 603 to 605 to the target sensing devices 2. Each sensing device 2 transmits observation information of communication indicated in the received monitoring list to the analysis server 10.

As described above, the analysis server 10 can appropriately receive observation information of communication in the network from each sensing device 2.

[Example of Processing Procedure]

Next, an example of a processing procedure of the analysis system 1 will be described with reference to FIG. 7. First, the acquisition unit 130 of the analysis server 10 transmits an instruction for transmitting observation information of communication to each sensing device 2 (S1). Each of the sensing devices 2 creates observation information of communication via the SW in the network that is a monitoring target on the basis of the above instruction, and transmits the observation information to the analysis server 10 (S2).

Thereafter, the estimation unit 131 of the analysis server 10 creates a list of communication observed by the SW (refer to, for example, the list 402 in FIG. 4) for each apparatus (for example, the SW) in the network that is a monitoring target on the basis of the observation information of communication transmitted from each sensing device 2.

On the basis of the created list, the estimation unit 131 estimates a MAC address of the router in the network that is a monitoring target according to the method described in above (Estimation 1 of MAC address of router) (S3: Router Estimation 1). The estimation unit 131 estimates the MAC address of the router according to the method described in above (Estimation 2 of MAC address of router) (S4: Router Estimation 2). Consequently, the estimation unit 131 can also estimate the MAC address of the router that cannot be estimated in S3.

The estimation unit 131 estimates an IP address of the external terminal according to the method described in the above (Estimation of external terminal) on the basis of the created list (S5: Estimation of external terminal). The estimation unit 131 records an estimation result of the MAC address of the router and an estimation result of the IP address of the external terminal obtained through the above process in the above list (refer to the list 601 in FIG. 6).

After S5, in a case where the list has been updated (for example, update of the estimation result of the MAC address of the router or update of the estimation result of the IP address of the external terminal) in the above list through the processes up to S5 (Yes in S6), the estimation unit 131 executes the processes in and after S4 again.

On the other hand, in a case where there is no update (for example, update of the estimation result of the MAC address of the router or update of the estimation result of the IP address of the external terminal) in the above list through the processes up to S5 (No in S6), the estimation unit 131 estimates a topology of the network on the basis of the above list (S7).

After S7, the allocation unit 132 allocates communication that is a target for transmission of the observation information from each sensing device 2 on the basis of the estimation result of the topology in S7. The list creation unit 133 creates a monitoring list for each sensing device 2 on the basis of the allocation result (S8). Thereafter, the list transmission unit 134 transmits the monitoring list for each sensing device 2 to each sensing device 2.

Thereafter, each sensing device 2 starts monitoring communication on the basis of the transmitted monitoring list (S9). If the observed communication is a target for transmission of the observation information indicated in the monitoring list (Yes in S10), each sensing device 2 transmits the observation information of the communication to the analysis server 10. On the other hand, if the observed communication is not a target for transmission (No in S10), each sensing device 2 continues monitoring (S11), and returns to S10.

Thereafter, when the acquisition unit 130 of the analysis server 10 receives the observation information from the sensing device 2 (S12), the analysis unit 135 specifies an apparatus (for example, a PC) included in the observation information from the estimation result of the topology (topology information) in S7 (S13). The analysis unit 135 performs a communication abnormality detection process by using information regarding the apparatus specified in S13 (S14). The analysis unit 135 executes the processes in the above S13 and S14 each time the observation information is received from the sensing device 2.

The processes in S13 and S14 in FIG. 7 will be described in detail with reference to FIG. 8. For example, the analysis unit 135 specifies an apparatus ID and a current installation location (NW configuration) of each apparatus from a device ID of the sensing device 2, an apparatus IP (an IP address of the apparatus), and an apparatus MAC (a MAC address of the apparatus) indicated in the observation information received in S12 in FIG. 7 (S131 in FIG. 8).

The analysis unit 135 determines whether there is a difference between the NW configuration specified in S131 and the topology information stored in the storage unit 12 (S132).

Here, in a case where the analysis unit 135 determines that there is no difference between the NW configuration specified in S131 and the topology information stored in the storage unit 12 (No in S132), the process proceeds to S141. S141 will be described later.

On the other hand, in a case where the analysis unit 135 determines that there is a difference between the NW configuration specified in S131 and the topology information stored in the storage unit 12 (Yes in S132), information regarding the difference is output via the communication unit 11 (S133). Consequently, the user of the analysis server 10 can ascertain that the configuration of the network that is a monitoring target has been changed. Thereafter, the analysis server 10 receives input of a determination result regarding whether the configuration change of the network is a normal configuration change from the user. Here, in a case where the analysis unit 135 receives an input indicating that the configuration change of the network is a normal configuration change from the user (Yes in S134), the topology information is updated on the basis of the NW configuration specified in S131 (S135).

Figure 7:
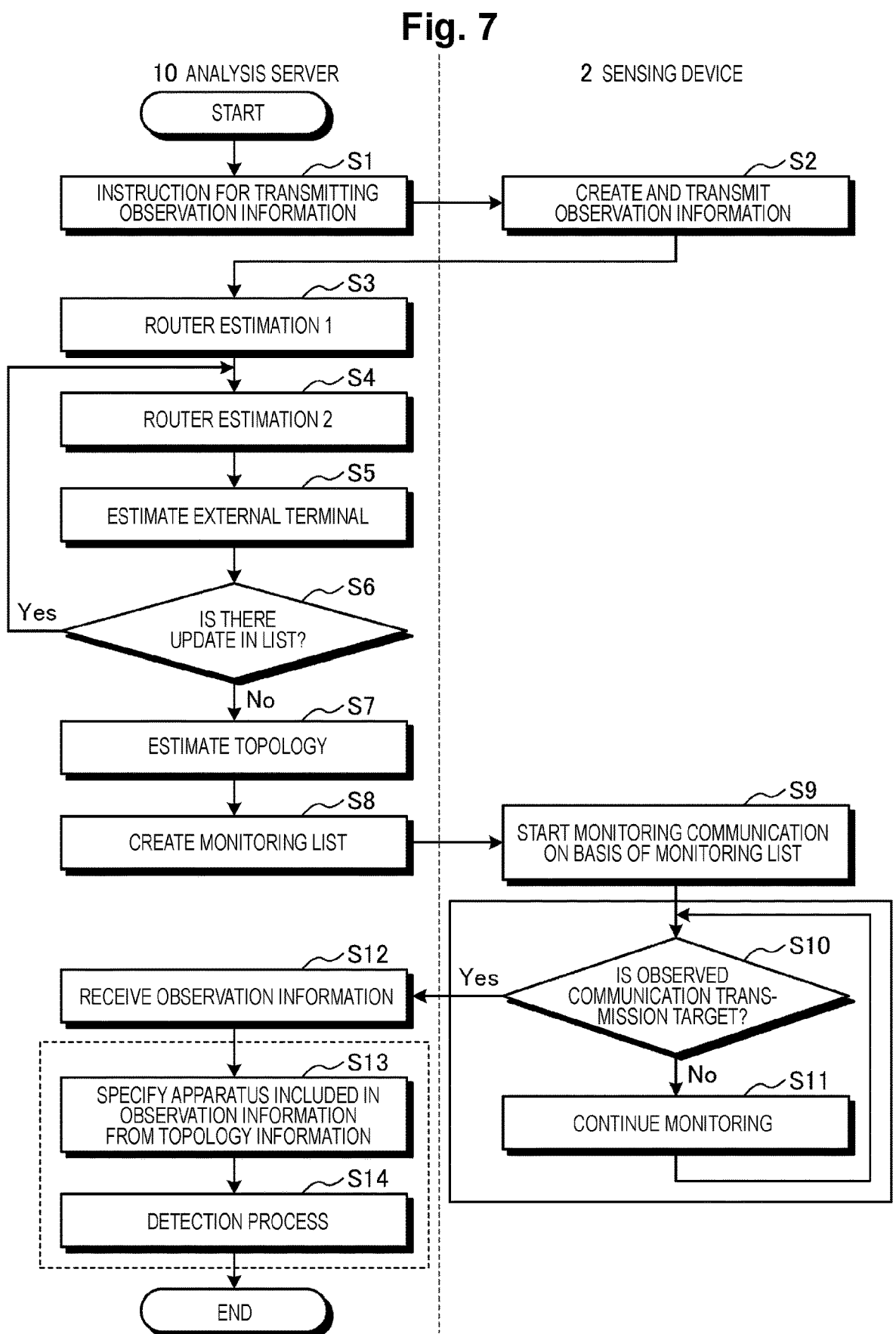
FIG. 7 is a sequence diagram illustrating an example of a processing procedure of the analysis system.

Thereafter, the analysis unit 135 performs a process of detecting communication details on the basis of the topology information updated in S135 and the observation information received in S12 in FIG. 7 (S141). For example, in a case where the pair of the IP address and the MAC address of the terminal indicated in the observation information received in S12 in FIG. 7 does not match the pair of the IP address and the MAC address indicated in the topology information, the analysis unit 135 detects the communication indicated in the observation information as communication performed by an impersonated terminal.

In a case where the analysis unit 135 detects an abnormality (for example, communication performed by an impersonated terminal) in the communication details through the detection process in S141 (Yes in S142), a notification indicating that the abnormality has been detected is sent through the communication unit 11 (S143: abnormality detection notification). Thereafter, the user handles the abnormality in the network on the basis of the notification.

On the other hand, in a case where analysis unit 135 does not detect an abnormality of the communication details through the detection process in S141 (No in S142), and when the topology information has been updated in S135 (Yes in S151), the process proceeds to S8 in FIG. 7. That is, on the basis of the topology information updated in S135, the allocation unit 132 reallocates communication that is a target for transmission of the observation information from each sensing device 2. The list creation unit 133 recreates a monitoring list for each of the sensing devices 2 on the basis of the reallocation result (S8 in FIG. 7). Thereafter, the list transmission unit 134 transmits the recreated monitoring list to each sensing device 2.

On the other hand, if the topology information has not been updated in S135 (No in S151 in FIG. 8), the process returns to S12 in FIG. 7. That is, the analysis server 10 waits for arrival of the observation information from the sensing device 2.

Figure 8:
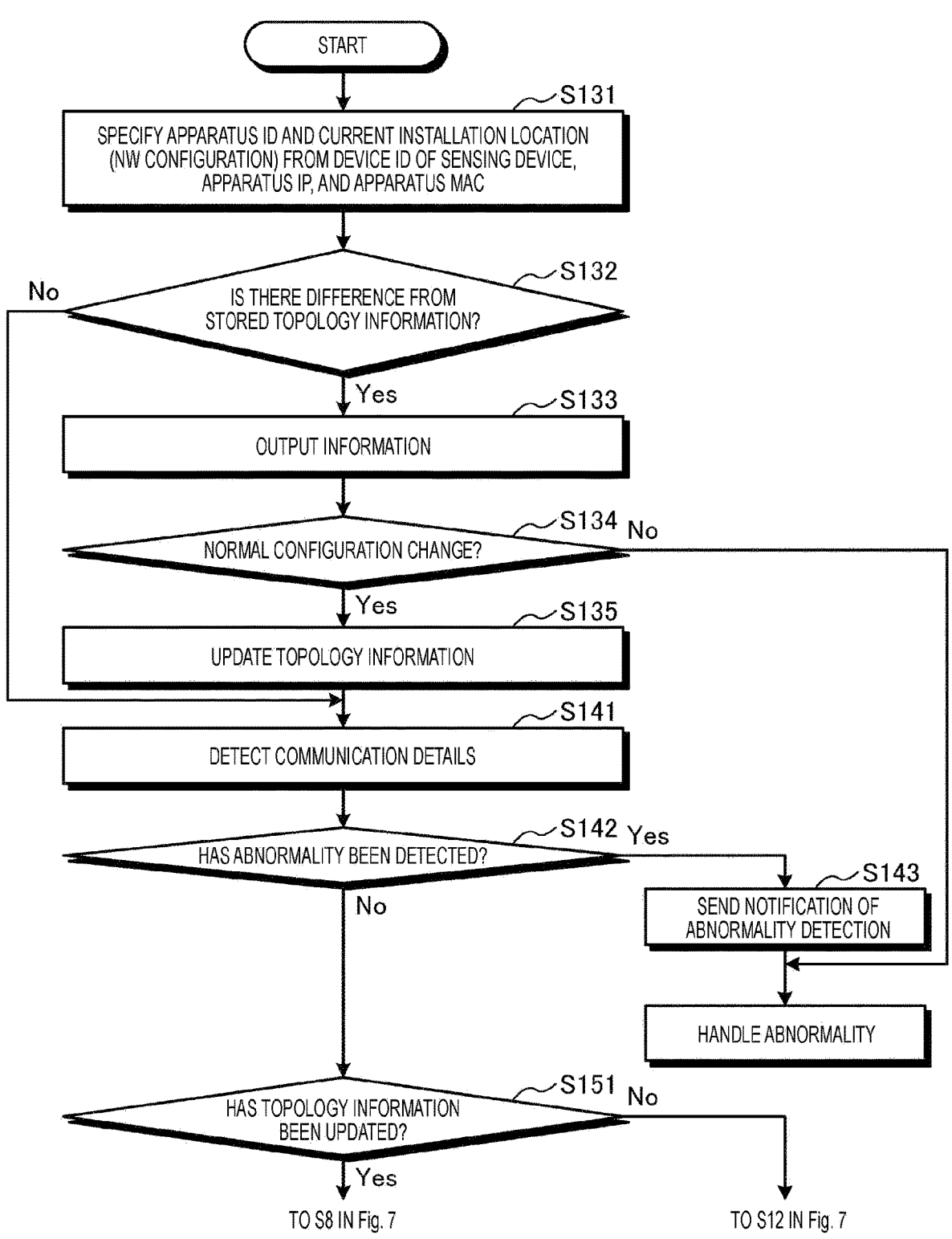
FIG. 8 is a flowchart illustrating details of processes in S13 and S14 in FIG. 7.

The analysis unit 135 outputs information regarding a difference between the NW configuration specified in S131 in FIG. 8 and the topology information stored in the storage unit 12 (S133), and in a case where it is determined by the user that some kind of abnormality has occurred in the configuration change of the network (No in S134), the user handles the abnormality in the network.

According to such an analysis server 10, each sensing device 2 is allocated such that the sensing device 2 of any one SW on a path of communication transmits observation information of the communication by using the estimated topology. Consequently, the analysis server 10 can reduce redundant transmission of the observation information from each sensing device 2.

Figure 3:
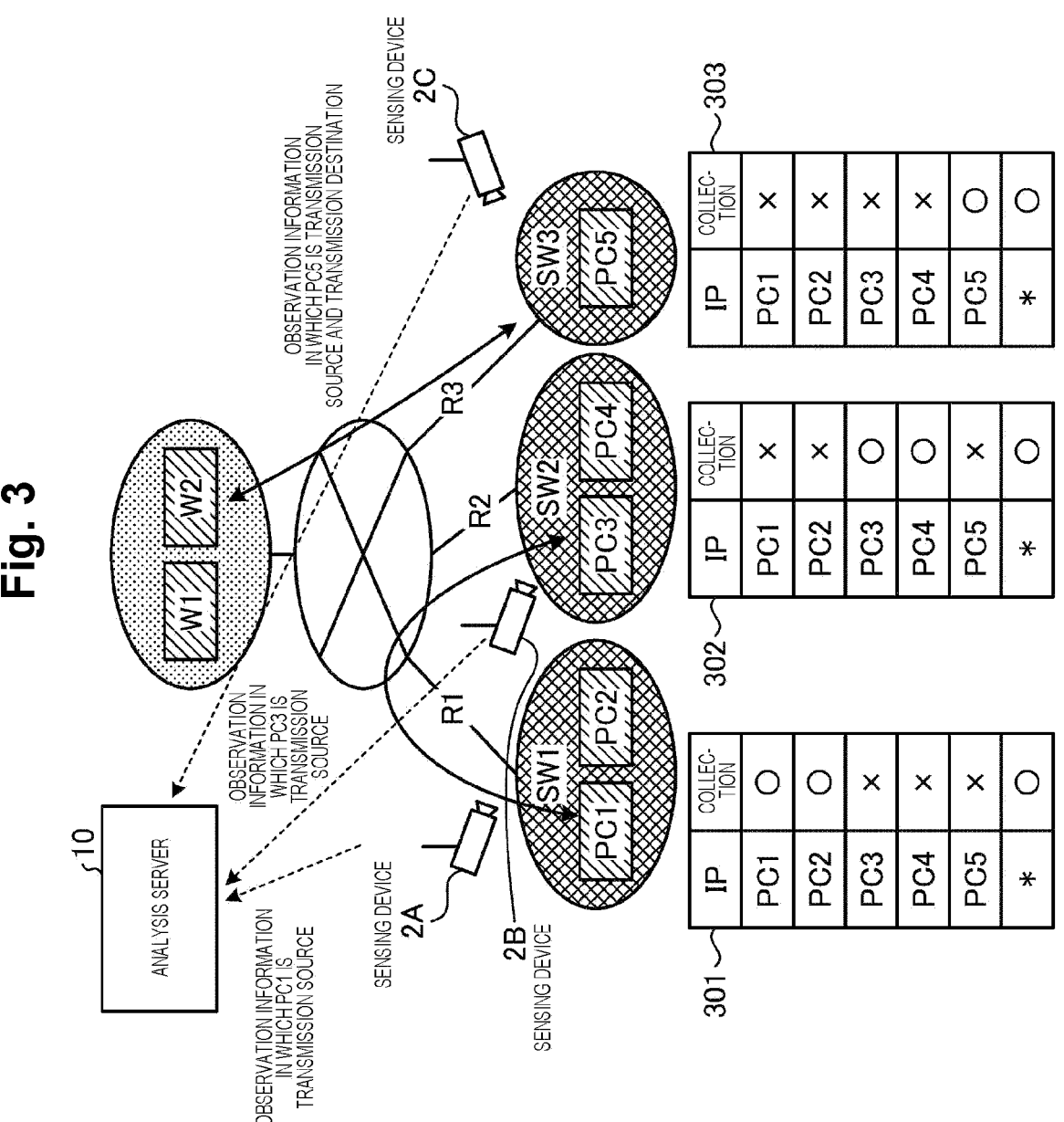
FIG. 3 is a diagram for describing a monitoring list.

For example, in a case where there is only one sensing device 2 capable of transmitting observation information of communication as in the communication between W2 and PC5 in FIG. 3 described above, the sensing device 2 transmits observation information of the communication to the analysis server 10. That is, the sensing device 2C in FIG. 3 transmits observation information for W2 to PC5 and observation information for PC5 to W2 to the analysis server 10. Consequently, the analysis server 10 can receive observation information of communication in the network that is a monitoring target without omission.

Figure 9:
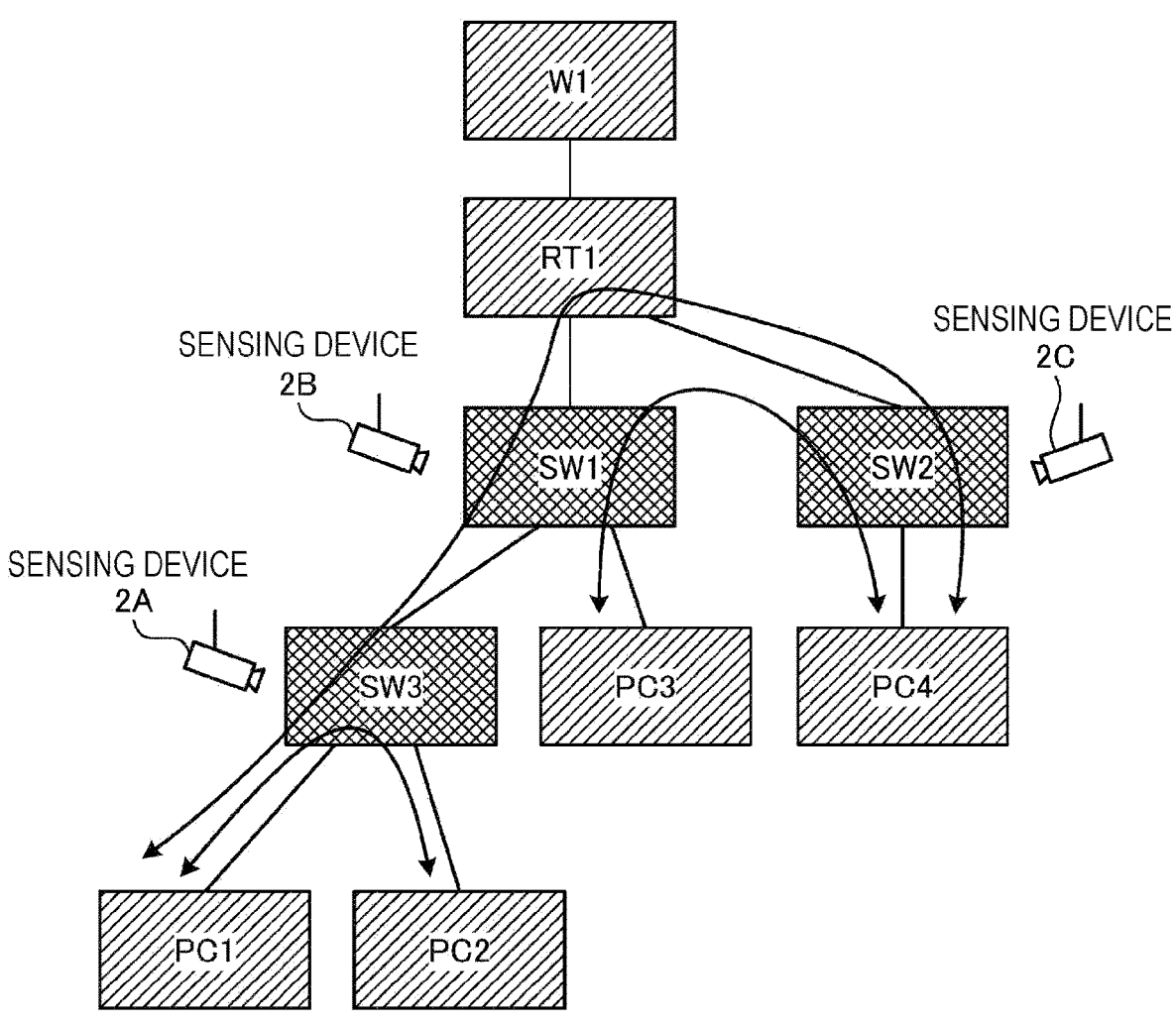
FIG. 9 is a diagram for describing estimation of an L2 topology performed by the analysis server.

For example, as illustrated in FIG. 9, in a case where a plurality of SWs (SW1, SW2, and SW3) are installed in the same subnet and the sensing device 2 is installed in each of the SWs, the analysis server 10 can estimate an L2 topology by comparing observation information from each of the sensing devices 2 (sensing devices 2A, 2B, and 2C). For example, the analysis server 10 can estimate the L2 topology by comparing observation information according to the methods described in (Estimation 1 of MAC address of router) and (Estimation 2 of MAC address of router).

The analysis server 10 can estimate an IP address and a MAC address of the router and an IP address of the external terminal by comparing observation information according to the methods described in (Estimation 1 of MAC address of router) and (Estimation 2 of MAC address of router). As a result, when the analysis server 10 detects an impersonated terminal by using the IP address and the MAC address indicated in the observation information from each sensing device 2, it is possible to reduce erroneous detection.

Figure 10:
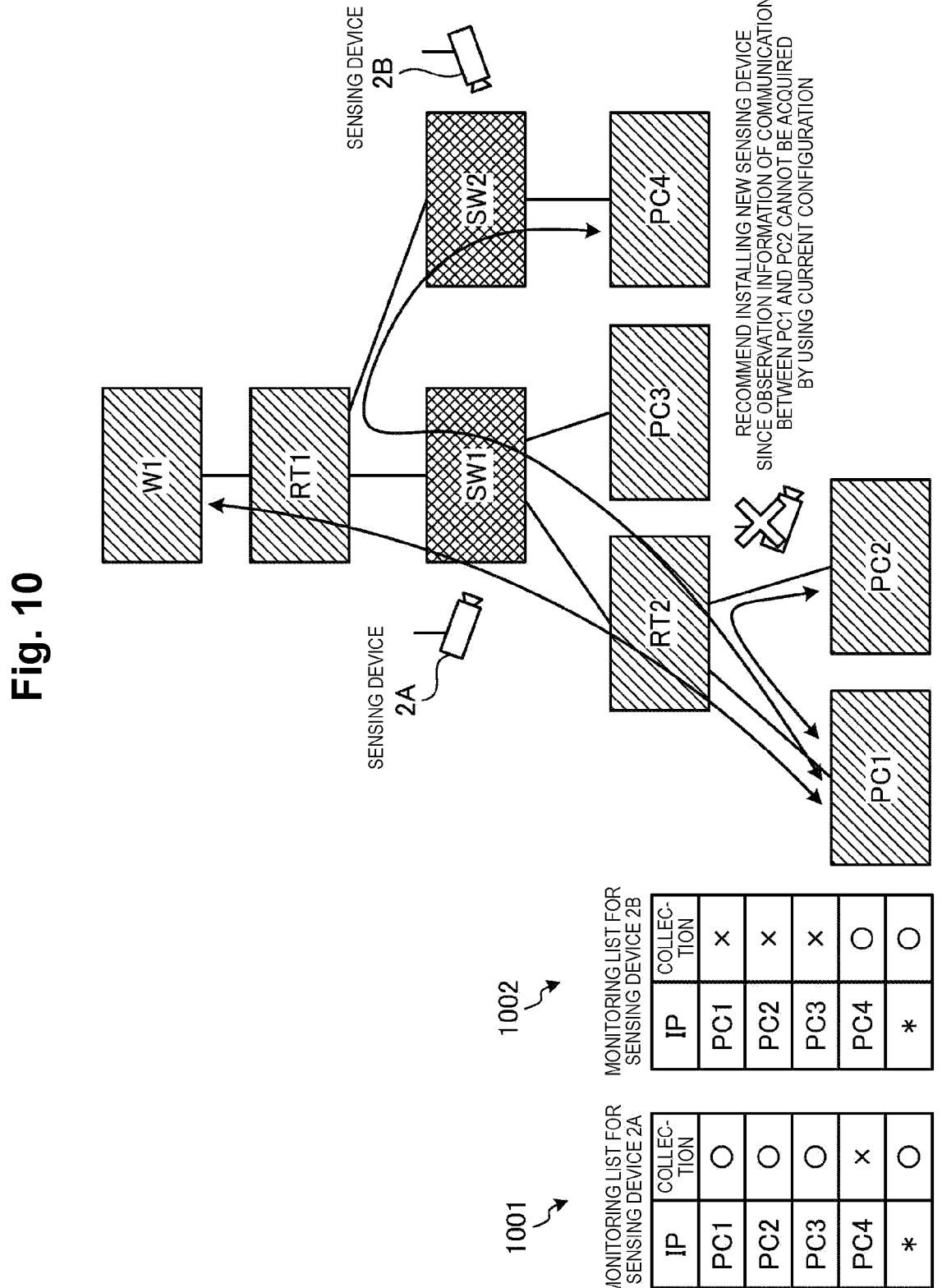
FIG. 10 is a diagram for describing estimation of a topology of a network in which routers are hierarchically installed, performed by the analysis server.

According to the analysis server 10, for example, as illustrated in FIG. 10, even in a case where routers (RT1, RT2) are hierarchically installed and the sensing device 2 is not installed under any router (RT2), a topology can be estimated by the same algorithm as described above.

For example, PC1 and PC2 illustrated in FIG. 10 are terminals of a network different from the network to which SW1 belongs, but the sensing device 2A of SW1 always observes communication in which PC1 and PC2 are transmission sources or transmission destinations. From this, the analysis server 10 estimates that PC1 and PC2 are under control of SW1. The analysis server 10 estimates, for example, the topology illustrated in FIG. 10 as a topology of the network.

Thereafter, the analysis server 10 creates a monitoring list denoted by the reference numeral 1001 as a monitoring list for the sensing device 2A of SW1, for example, by using the estimation result of the topology. The analysis server 10 creates, for example, a monitoring list denoted by the reference numeral 1002 as a monitoring list for the sensing device 2B of SW2. The analysis server 10 acquires observation information transmitted from the sensing devices 2A and 2B on the basis of the monitoring list. Thus, the analysis server 10 can acquire observation information of communication between PC1 and PC2.

As described above, the analysis server 10 can also monitor communication between terminals in a complicated network such as a network in which routers are hierarchically installed as illustrated in FIG. 10. In a technique in which only a local network is a monitoring target as in the conventional technique, communication of terminals outside the local network, such as PC1 and PC2 in FIG. 10, cannot be monitored However, according to the analysis server 10 of the present embodiment, communication of terminals outside the local network, such as PC1 and PC2 in FIG. 10, can be monitored.

The analysis unit 135 of the analysis server 10 may output information regarding a monitoring location insufficient for monitoring communication in the network on the basis of the estimated topology of the network and the information regarding the installation location of the sensing device 2 in the network.

For example, in the network illustrated in FIG. 10, since observation information of the communication between PC1 and PC2 cannot be acquired with the current configuration, the analysis unit 135 recommends installing a new sensing device 2 at a location (for example, RT2) where the communication between PC1 and PC2 can be monitored. Consequently, the user of the analysis server 10 can ascertain a location where the sensing device 2 is added in order to monitor each piece of communication in the network without omission.

According to the analysis server 10, it is possible to estimate a topology that does not contradict an actual network configuration on the basis of the observation information transmitted from each sensing device 2. For example, there is a possibility that there is a location that the analysis server 10 cannot accurately estimate a network configuration depending on a case where observation information is insufficient or an installation location of the sensing device 2, but sensing (acquisition of observation information of communication from each sensing device 2) can be performed without any problem.

Even if estimation of a topology by the analysis server 10 is incomplete due to the lack of information, at least one sensing device 2 transmits observation information of each piece of communication, and thus missing of the observation information does not occur.

Since the analysis server 10 can detect new observation information or a network configuration change, connection of an unauthorized apparatus or movement of an apparatus can be detected. After detecting the configuration change of the network, the analysis server 10 can update the topology information and perform a communication detection process on the basis of the updated topology information and the observation information of the communication (refer to S141 in FIG. 7). Consequently, the analysis server 10 can appropriately perform a communication detection process.

After detecting the configuration change of the network, the analysis server 10 can recreate and transmit the monitoring list for each sensing device 2 on the basis of the updated topology information. Consequently, the analysis server 10 can appropriately receive observation information from each sensing device 2.

Figure 11:
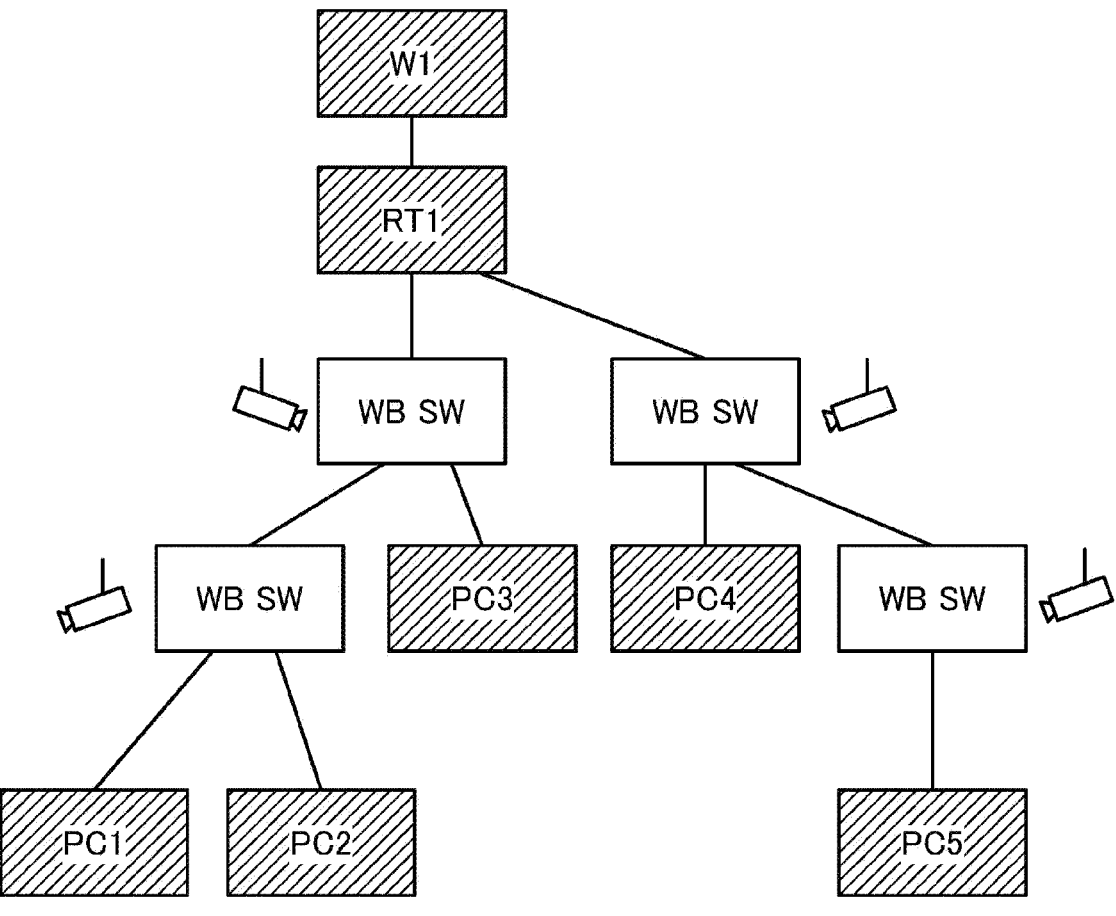
FIG. 11 is a diagram illustrating an example of a network configured by a white box switch (WB SW) having a function of a sensing device.

The network that is a monitoring target of the analysis server 10 may be a network configured by a white box switch (WB SW) having the function of the sensing device 2 (FIG. 11). In this case, the analysis server 10 transmits a monitoring list to each WB SW. Each WB SW transmits observation information of communication to the analysis server 10 on the basis of the monitoring list transmitted from the analysis server 10. The analysis server 10 monitors the communication in the network on the basis of the observation information of the communication transmitted from each WB SW.

[System Configuration and the Like]

Each constituent of each unit illustrated in the drawings is functionally conceptual and does not necessarily need to be physically configured as illustrated in the drawings. In other words, a specific form of distribution and integration of individual devices is not limited to the illustrated form, and all or some of the devices may be functionally or physically distributed and integrated in any unit according to various loads, usage conditions, and the like. All or some of the processing functions performed in the respective devices may be realized by a CPU and a program to be executed by the CPU or may be realized as hardware by wired logic.

Among the processes described in the above embodiment, all or some of the processes described as being automatically performed may be manually performed, or all or some of the processes described as being manually performed may be automatically performed according to a known method. The processing procedure, the control procedure, the specific name, and the information including various types of data and parameters that are illustrated in the document and the drawings can be freely changed unless otherwise specified.

[Program]

The analysis server 10 can be implemented by installing a program as package software or online software in a desired computer. For example, by causing an information processing apparatus to execute the above program, the information processing apparatus can be caused to function as the analysis server 10. The information processing apparatus mentioned here includes a desktop or a laptop personal computer. The information processing apparatus also includes a mobile communication terminal such as a smartphone, a mobile phone, or a personal handy-phone system (PHS) and a terminal such as a personal digital assistant (PDA).

The analysis server 10 may also be implemented as a server apparatus that uses a terminal apparatus used by a user as a client and provides the client with a service related to the above process. In this case, the server apparatus may be implemented as a web server or may be implemented as a cloud that provides a service related to the above process by outsourcing.

Figure 12:
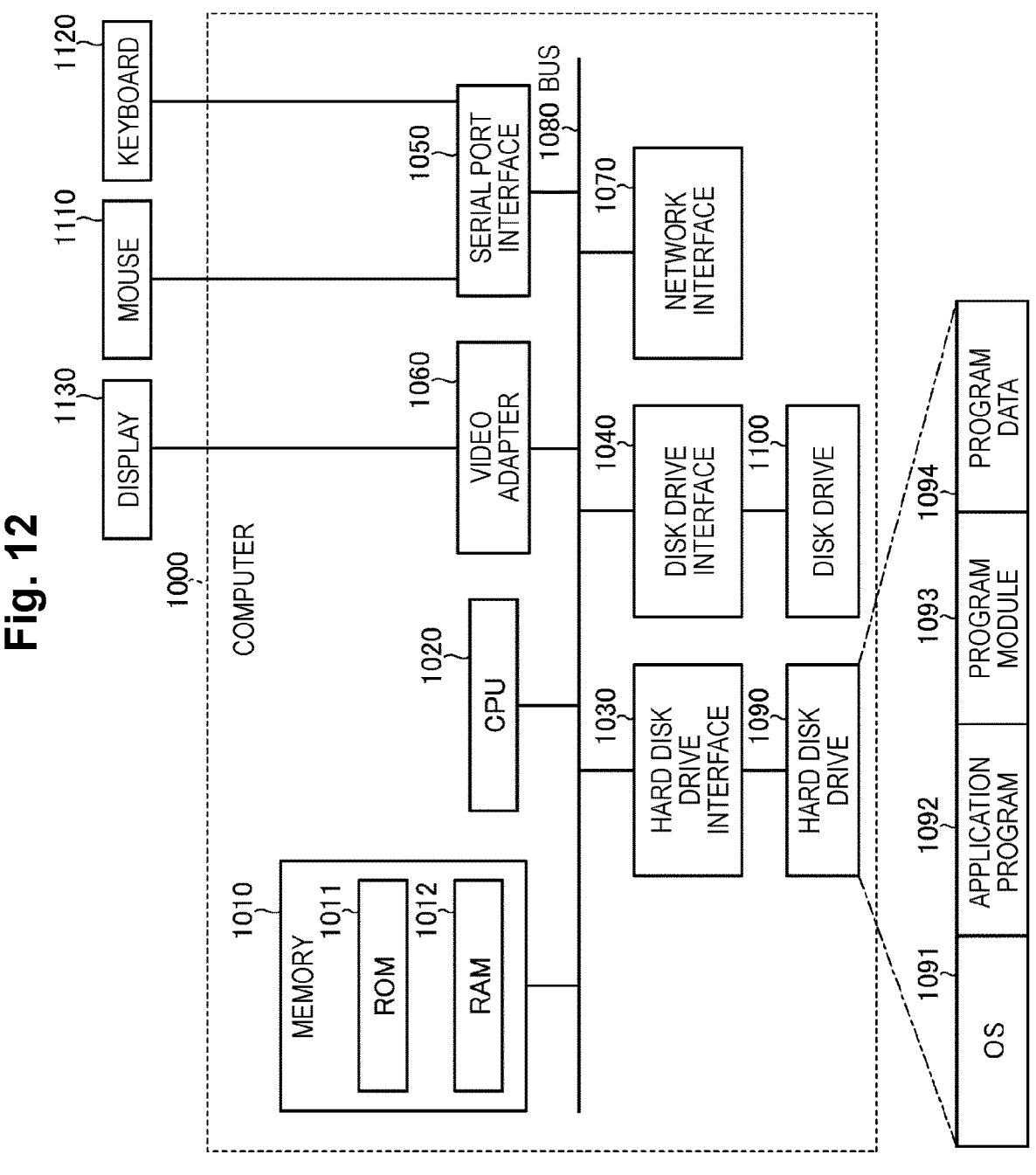
FIG. 12 is a diagram illustrating a configuration example of a computer that executes an analysis program.

FIG. 12 illustrates an example of a computer that executes an analysis program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected to each other via a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. That is, a program that defines each process executed by the analysis server 10 is implemented as the program module 1093 in which a computer executable code is described. The program module 1093 is stored in, for example, the hard disk drive 1090. For example, the program module 1093 for executing processes similar to those of the functional configuration in the analysis server 10 is stored in the hard disk drive 1090. The hard disk drive 1090 may be replaced with a solid state drive (SSD).

Data to be used in the processes of the above embodiment is stored in, for example, the memory 1010 or the hard disk drive 1090 as the program data 1094. The CPU 1020 reads the program module 1093 or the program data 1094 stored in the memory 1010 or the hard disk drive 1090 to the RAM 1012 as necessary and executes the program module 1093 or the program data 1094.

The program module 1093 or the program data 1094 is not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). The program module 1093 and the program data 1094 may be read by the CPU 1020 from another computer via the network interface 1070.

REFERENCE SIGNS LIST

1 Analysis system
2 (2A, 2B, 2C) Sensing device
10 Analysis server
11 Communication unit
12 Storage unit
13 Control unit
130 Acquisition unit
131 Estimation unit
132 Allocation unit
133 List creation unit
134 List transmission unit
135 Analysis unit
136 Control processing unit

The invention claimed is:

1. An analysis apparatus comprising: a memory; and a processor coupled to the memory and programmed to execute a process comprising:
acquiring, from each communication observation device of a plurality of communication observation devices that observe communication in a network, observation information of the communication including a transmission source Internet Protocol (IP) address, a transmission source Media Access Control (MAC) address, a transmission destination IP address, and a transmission destination MAC address in the communication;
estimating a topology of the network on the basis of the acquired observation information;
allocating one communication observation device of the plurality of communication observation devices to observe a path of the network, wherein the one communication observation device is on the path of the communication and transmits:
the observation information of the communication for each piece of communication flowing through the network on the basis of the estimated topology,
an installation position of the one communication observation device on the path of the network, and
the observation information of the communication acquired from the one communication observation device;
creating, based on a result of the allocating operation of the one communication observation device, a monitoring list indicating one or more target communications for observation and for transmission by the allocated one communication observation device; and
transmitting the created monitoring list to respective communication observation devices of the plurality of communication observation devices, thereby preventing transmission of a plurality of pieces of observation information of an instance of communication, wherein the respective communication observation devices are allocated to transmit the observation information of the communication with the same transmission source IP address and transmission source MAC address.

2. The analysis apparatus according to claim 1, wherein the estimating the topology of the network further comprises estimating the topology of the network including an IP address and a MAC address of an apparatus in the network on the basis of the acquired observation information, and
the process further comprises:
detecting communication performed by an impersonated apparatus, by comparing a pair of an IP address and a MAC address of the apparatus included in the acquired observation information of the communication with a pair of an IP address and a MAC address of the apparatus included in the estimated topology.

3. The analysis apparatus according to claim 2, wherein the process further comprises
detecting whether or not there is a change in the topology of the network by comparing the estimated topology of the network with a past topology of the network.

4. The analysis apparatus according to claim 3, wherein in a case of the detecting that there is a change in the topology of the network,
the creating a monitoring list further comprises recreating a monitoring list for each of the communication observation devices on the basis of the estimated topology and the observation information, and
the transmitting the created monitoring list further comprises transmitting the recreated monitoring list for each of the communication observation devices to each of the communication observation devices.

5. The analysis apparatus according to claim 2, wherein the process further comprises
specifying a monitoring location insufficient for monitoring each piece of communication in the network on the basis of the estimated topology of the network and information regarding an installation location of the communication observation device in the network, and outputting the specified monitoring location.

6. The analysis apparatus according to claim 1, wherein in a case where the plurality of communication observation devices is installed in a same subnet in the network,
the estimating the topology of the network further comprises estimating a topology of an L2 network in the subnet on the basis of a difference between pieces of observation information acquired from the respective communication observation devices.

7. An analysis method executed by an analysis apparatus, comprising:
acquiring, from each communication observation device of a plurality of communication observation devices that observe communication in a network, observation information of the communication including a transmission source Internet Protocol (IP) address, a transmission source Media Access Control (MAC) address, a transmission destination IP address, and a transmission destination MAC address in the communication;
estimating a topology of the network on the basis of the acquired observation information;
allocating one communication observation device of the plurality of communication observation devices to observe a path of the network, wherein the one communication observation device is on the path of the communication and transmits;
the observation information of the communication for each piece of communication flowing through the network on the basis of the estimated topology,
an installation position of the one communication observation device on the path of the network, and the observation information of the communication acquired from the communication observation device;

creating, based on a result of the allocating operation of the one communication observation device, a monitoring list indicating one or more target communications for observation and for transmission by the allocated one communication observation device; and transmitting the created monitoring list to respective communication observation devices of the plurality of communication observation devices, thereby preventing transmission of a plurality of pieces of observation information of an instance of communication, wherein the respective communication observation devices are allocated to transmit the observation information of the communication with the same transmission source IP address and transmission source MAC address.

8. A non-transitory computer readable storage medium having stored therein an analysis program that causes a computer to execute a process comprising the steps of:

acquiring, from each communication observation device of a plurality of communication observation devices that observe communication in a network, observation information of the communication including a transmission source Internet Protocol (IP) address, a transmission source Media Access Control (MAC) address, a transmission destination IP address, and a transmission destination MAC address in the communication;

estimating a topology of the network on the basis of the acquired observation information;

allocating one communication observation device of the plurality of communication observation devices to observe a path of the network, wherein the one communication observation device is on the path of the communication and transmits:

the observation information of the communication for each piece of communication flowing through the network on the basis of the estimated topology, an installation position of the one communication observation device on the path of the network, and the observation information of the communication acquired from the communication observation device;

creating, based on a result of the allocating operation of the one communication observation device, a monitoring list indicating one or more target communications for observation and for transmission by the allocated one communication observation device; and transmitting the created monitoring list to respective communication observation devices of the plurality of communication observation devices, thereby preventing transmission of a plurality of pieces of observation information of an instance of communication, wherein the respective communication observation devices are allocated transmit the observation information of the communication with the same transmission source IP address and transmission source MAC address.

* * * * *